United States Patent
Payne

(10) Patent No.: US 11,084,401 B1
(45) Date of Patent: Aug. 10, 2021

(54) SEAT FOR WORK VEHICLE

(71) Applicant: KUBOTA CORPORATION, Osaka (JP)

(72) Inventor: Kirk Payne, Lakemont, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/750,402

(22) Filed: Jan. 23, 2020

(51) Int. Cl.
| | |
|---|---|
| *B60N 2/68* | (2006.01) |
| *B60N 2/16* | (2006.01) |
| *B60N 2/64* | (2006.01) |
| *B60N 2/90* | (2018.01) |
| *B60N 2/015* | (2006.01) |
| *B60N 2/02* | (2006.01) |
| *B60N 2/38* | (2006.01) |

(52) U.S. Cl.
CPC .............. *B60N 2/16* (2013.01); *B60N 2/015* (2013.01); *B60N 2/64* (2013.01); *B60N 2/68* (2013.01); *B60N 2/919* (2018.02); *B60N 2/38* (2013.01); *B60N 2002/022* (2013.01)

(58) Field of Classification Search
CPC ...... B60N 2002/2204; B60N 2002/022; B60N 2/68; B60N 2/0284
See application file for complete search history.

(56) References Cited

U.S. PATENT DOCUMENTS

| | | | | |
|---|---|---|---|---|
| 4,981,325 A | * | 1/1991 | Zacharkow | A47C 7/405 297/230.14 |
| 5,071,190 A | * | 12/1991 | Tame | B60N 2/1615 297/344.15 |
| 8,561,748 B1 | | 10/2013 | Hahn et al. | |
| 10,023,083 B1 | | 7/2018 | Tada | |
| 2003/0214166 A1 | * | 11/2003 | Schambre | B60N 2/68 297/353 |
| 2013/0193710 A1 | * | 8/2013 | Kimura | B60N 2/146 296/65.06 |
| 2014/0306506 A1 | * | 10/2014 | Ruspa | B60N 2/68 297/452.19 |
| 2018/0319330 A1 | * | 11/2018 | Balma | B60N 2/803 |
| 2019/0359246 A1 | * | 11/2019 | Lee | B60T 7/06 |

FOREIGN PATENT DOCUMENTS

| | | | | |
|---|---|---|---|---|
| CA | 2392891 A1 | * | 6/2001 | ........... B60N 2/4221 |
| CA | 2949520 A1 | * | 11/2015 | ........... A61G 5/1067 |
| DE | 19943707 A1 | * | 3/2001 | ........... B60N 2/0284 |
| DE | 102018008658 A1 | * | 12/2019 | ............. B60N 2/688 |
| FR | 2105495 A5 | * | 4/1972 | ............... B60N 2/62 |
| FR | 2730460 A1 | * | 8/1996 | ............. B60N 2/767 |
| WO | WO-0069671 A1 | * | 11/2000 | ........... B60N 2/0284 |
| WO | WO-0105624 A1 | * | 1/2001 | ............... B60N 2/68 |
| WO | WO-2012166084 A1 | * | 12/2012 | .............. A47C 7/402 |
| WO | WO-2018169575 A1 | * | 9/2018 | ............... B60N 2/66 |

* cited by examiner

Primary Examiner — Timothy J Brindley
(74) Attorney, Agent, or Firm — Greenblum & Bernstein, P.L.C.

(57) ABSTRACT

A seat for a work vehicle includes a bottom frame fixed to a seat bracket supported to a vehicle body frame, a top frame supported to the bottom frame to be vertically slidable relative thereto, a setting tool for setting the top fame to the bottom fame at a plurality of vertically adjustable position, a seat cushion attached to the bottom frame and a seat back. The seat back consists of an upper seat back attached to the top frame and a lower seat back attached to the bottom frame.

6 Claims, 4 Drawing Sheets

SEAT FOR WORK VEHICLE

TECHNICAL FIELD

The present invention relates to a seat to be mounted on a work vehicle and consisting of a seat cushion and a seat back.

BACKGROUND ART

U.S. Pat. No. 8,561,748 discloses a seat mounted on a zero-turn mower (an off-road vehicle). This seat includes a bottom frame, a back frame, a seat cushion attached to the bottom frame, and a seat back attached to the back frame. The bottom frame is displaceable via a suspension and an adjustment mechanism is provided for adjusting this displacement (movement) of the bottom frame. With this, a movement of the bottom frame, consequentially, a movement of the seat cushion, is adjustable by the adjustment mechanism.

Similarly, in a seat assembly disclosed by U.S. Pat. No. 10,023,083, a seat consisting of a seat cushion and a seat back formed integral with each other is fixed to a seat plate which is pivotable in the front/rear direction about a horizontal axis. The seat plate is supported to a seat base via a suspension unit. The seat base is supported to a vehicle body frame via a rail mechanism. The seat is slidable in the front/rear direction by the rail mechanism.

SUMMARY OF THE INVENTION

In the case of the seat according to the U.S. Pat. No. 8,561,748 described above, the seat back is attached to a vertical frame which extends upwards from the bottom frame and the position, etc. of the seat back is non-adjustable. For this reason, it is difficult for a person of a high sitting height or a low sitting height to have his/her upper body (in particular, the area downwardly of the shoulder) accommodated by this seat back at a comfortable position. Similarly, with the seat according to the U.S. Pat. No. 10,023,083 too, as the position of the seat back is immovable relative to the seat cushion, it is difficult for an upper body of a person seated in the seat cushion to be accommodated at an appropriate position.

In view of the above-described state of the art, a principal object of the present invention lies in providing a seat for a work vehicle, capable of receiving/accommodating an upper body of a person seated in a seat cushion at an appropriate position.

For accomplishing the above-noted object, a seat for a work vehicle according to the present invention comprises:
  a seat bracket supported to a vehicle body frame;
  a bottom frame fixed to the seat bracket;
  a top frame supported to the bottom frame to be vertically slidable relative thereto;
  a setting tool for setting the top fame to the bottom fame at a plurality of vertically adjustable positions;
  a seat cushion;
  a seat back;
  the seat cushion being attached to the bottom frame; and
  the seat back being comprised of an upper seat back attached to the top frame and a lower seat back attached to the bottom frame.

With the above-described configuration, the seat back is divided into an upper seat back and a lower seat back. The upper seat back is vertically movable relative to the lower seat back and can be fixed at an adjustment position selected from a plurality of vertical adjustment positions. With this, the upper body of a person seated in the seat cushion can be received and stopped at an appropriate position by the lower seat back and the adjusted upper seat back.

The vertical position adjustment of the upper seat back relative to the lower seat back is realized by constituting a frame to which the lower seat back is attached of a tubular member and providing a slide rod insertable into this tubular member at the lower end of the frame to which the upper seat back is to be attached. In order to fix the upper seat back at a selected adjustment position, there are employed a plurality of through holes and a fixing pin to be inserted therein. Needless to say, in the case of employing a method of fixing the slide rod with a frictional force or the like, the upper seat back will be fixable at a desired adjustment position.

DETAILED DESCRIPTION

In the following embodiment, as one example of a work vehicle on which the inventive seat is to be mounted, a zero-turn mower is used. Incidentally, in this detailed description, unless indicated explicitly otherwise, "front" means the front side with respect to the machine body front/rear direction (traveling direction), and "rear" means the rear side with respect to the machine body front/rear direction (traveling direction). Also, the left/right direction or lateral direction means the machine body transverse direction (machine body width direction) perpendicular to the machine body front/rear direction. And, "upper" or "lower" refers to the positional relation with respect to the perpendicular direction (vertical direction) of the machine body, representing the relation with respect to the ground clearance.

Figure 1:
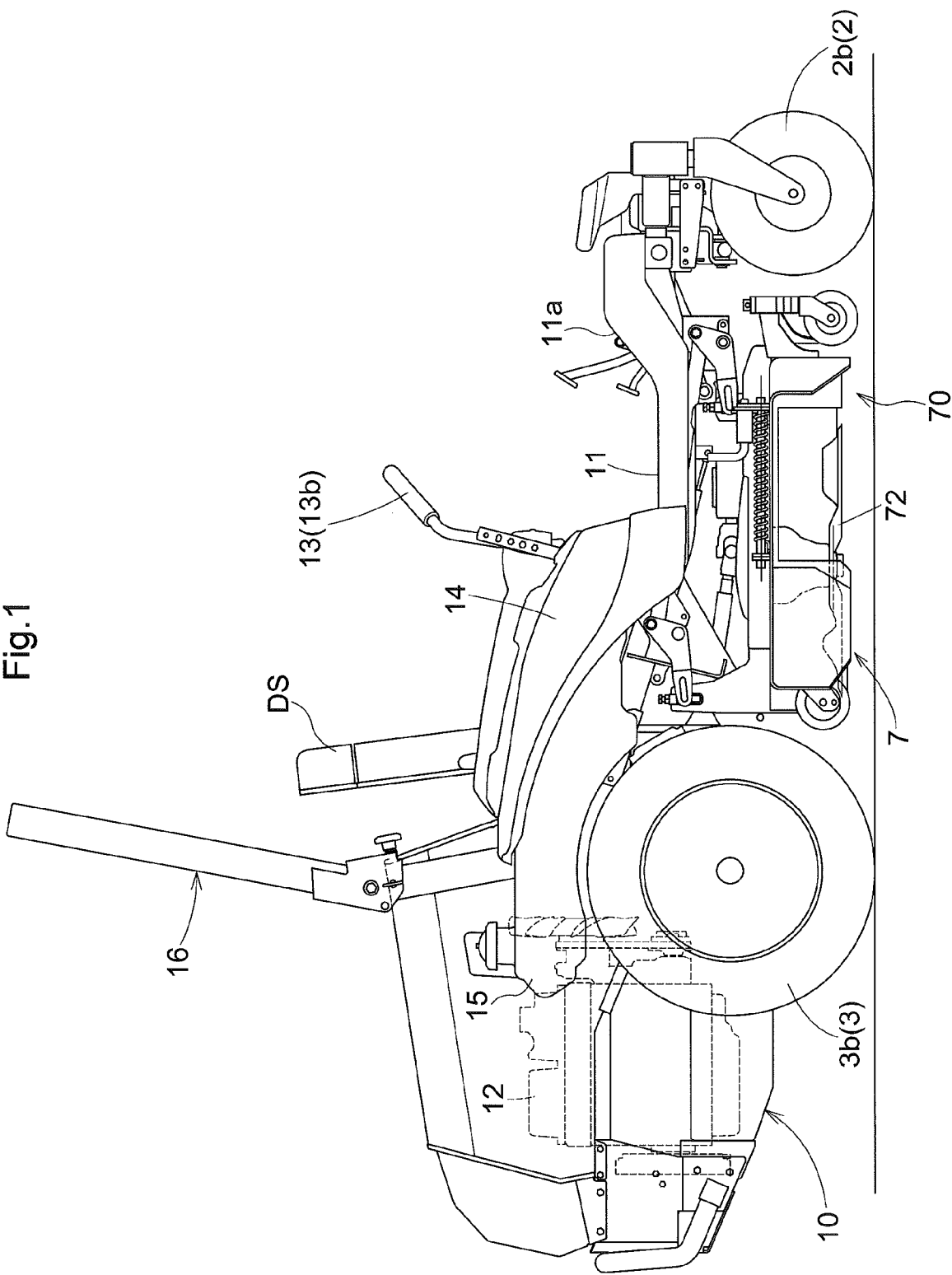
FIG. 1 is a side view of a zero-turn mower.
Figure 2:
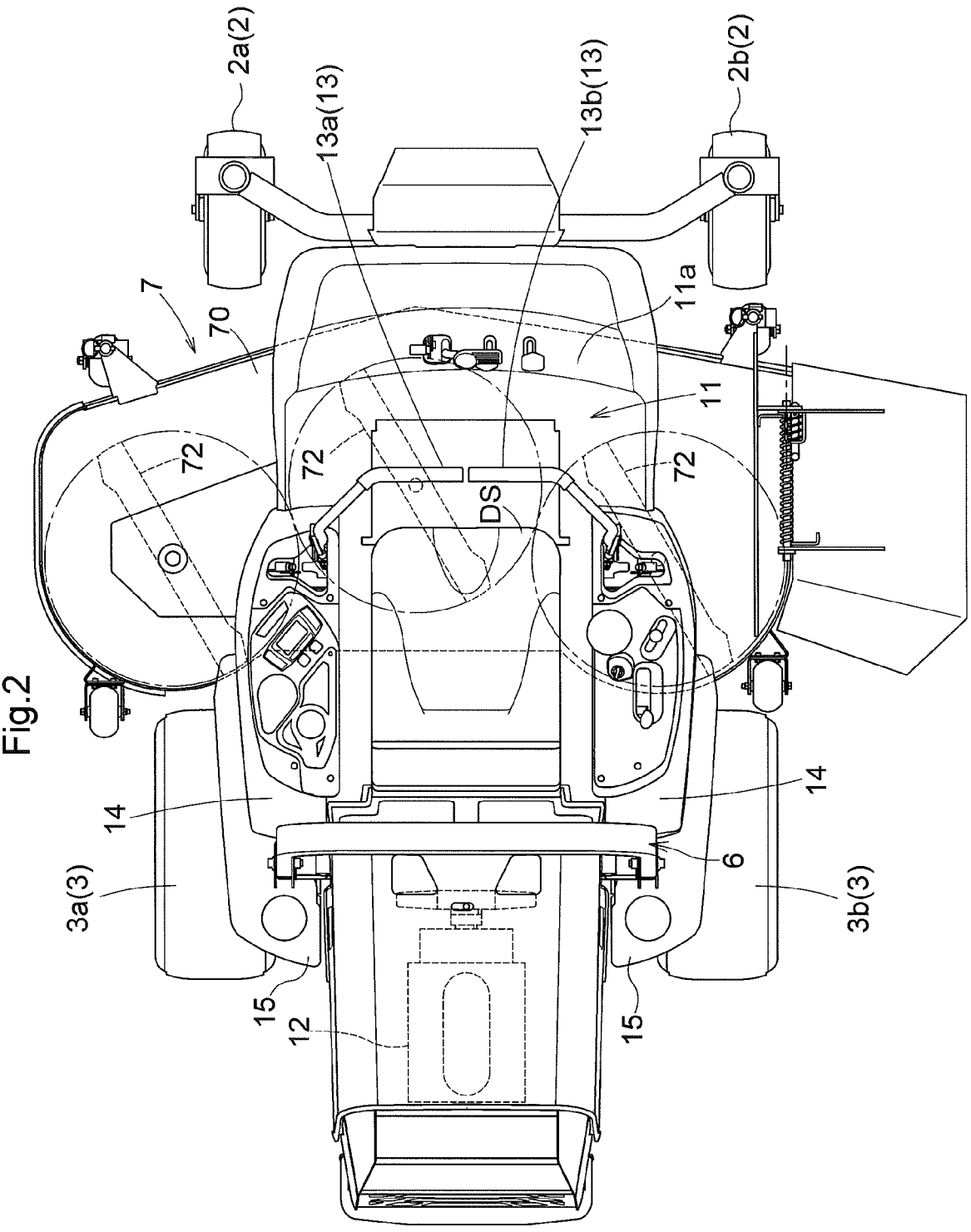
FIG. 2 is a plan view of the zero-turn mower.

As shown in FIG. 1 and FIG. 2, this zero-turn mower includes a vehicle body frame 10 which is supported on the ground surface via a front wheel unit 2 configured as a caster unit and a rear wheel unit 3 comprised as a driving wheel unit. A left rear wheel 3*a* and a right rear wheel 3*b* together constituting the rear wheel unit 3 can be controlled in the forward and reverse rotations thereof independently of each other. The front wheel unit 2 includes a left front wheel 2*a* and a right front wheel 2*b*. The vehicle body frame 10 includes a pair of left and right elongate frames extending in the vehicle body front/rear direction and a cross beam which extends in the vehicle body transverse direction to interconnect the longitudinal frames, with these frames being made of angular pipes, plates, or the like. A mower unit 7 is suspended from the vehicle body frame 10 to be liftable up/down between the front wheel unit 2 and the rear wheel unit 3.

At a center portion of the vehicle body frame 10, there is provided a driver's seat (to be referred to simply as the "seat" hereinafter) DS. As no cabin is mounted, the driver's seat DS is exposed to the outside. On the upper frame of the front portion of the vehicle body frame 10, there is laid a floor plate 11 used as a footrest for a driver. A sloped front region of the floor plate 11 is used as a footrest 11a where a foot operational tool is disposed. At a rear portion of the vehicle body frame 10 rearwardly of the seat DS, there are disposed an engine 12 as an internal combustion engine and engine accessories such as a radiator.

A maneuvering unit 13 as one user operational device consists of a left maneuvering lever 13a disposed on the left side of the seat DS and a right maneuvering lever 13b disposed on the right side of the seat DS. The left maneuvering lever 13a is used for adjusting a rotational speed of the left rear wheel 3a and the right maneuvering lever 13b is used for adjusting a rotational speed of the right rear wheel 3b. The left maneuvering lever 13a and the right maneuvering lever 13b are pivotally displaceable over and between a forward traveling speed change range, the neutral and a reverse traveling speed change range.

On the left and right opposed sides of the seat DS, fenders 14 are provided. On top faces of these fenders 14, there are disposed user operational devices such as veracious kinds of operational levers and operational buttons, etc. Rearwardly of the seat DS, an arch-shaped ROPS 16 is vertically mounted. Beneath the fenders 14, a fuel tank 15 is disposed.

The mower unit 7 includes a side-discharge type mower deck 70. In the space inside the mower deck 70, there are provided three blades 72 disposed side by side in the vehicle body transverse direction. These blades 72 are rotated by power from the engine 12.

Power from the engine 12, though not shown herein, is transmitted via a traveling transmission including a pair of left and right HST (hydrostatic transmissions) to the left rear wheel 3a and the right rear wheel 3b independently. Speeds including forward traveling, reverse traveling and neutral are adjusted by pivotal operations of the left maneuvering lever 13a and the right maneuvering lever 13b. More particularly, in accordance with user operations on the left maneuvering lever 13a and the right maneuvering lever 13b, a stopped state, a straight traveling state, a gentle turning state, a pivot turning state and a spin turning state will be realized respectively. The stopped state is realized by stopping the left rear wheel 3a and the right rear wheel 3b. The straight traveling state is realized by rotatably driving the left rear wheel 3a and the right rear wheel 3b at an equal speed either forwardly or reversely. The gentle turning state is realized by rotatably driving the left rear wheel 3a and the right rear wheel 3b at different speeds either forwardly or reversely. The pivot turning state is realized by stopping one of the left rear wheel 3a and the right rear wheel 3b and rotatably driving the other forwardly or reversely. The spin turning state is realized by rotatably driving one of the left rear wheel 3a and the right rear wheel 3b forwardly and rotatably driving the other reversely.

Figure 3:
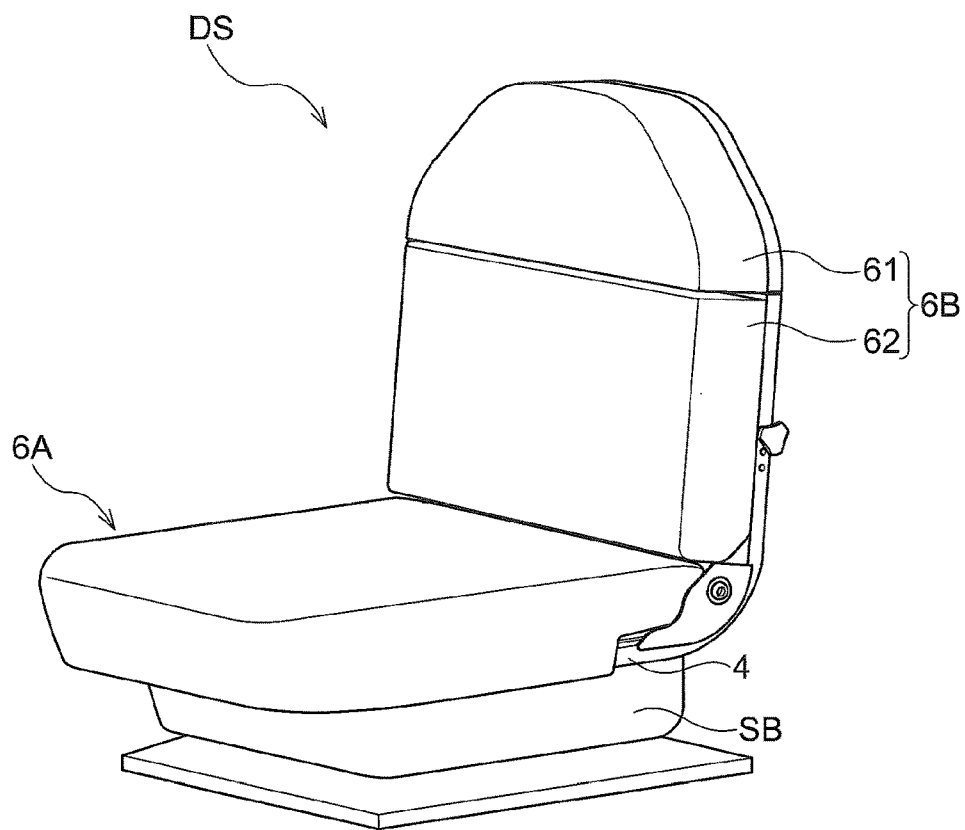
FIG. 3 is a perspective view of a seat mounted on the zero-turn mower.
Figure 4:
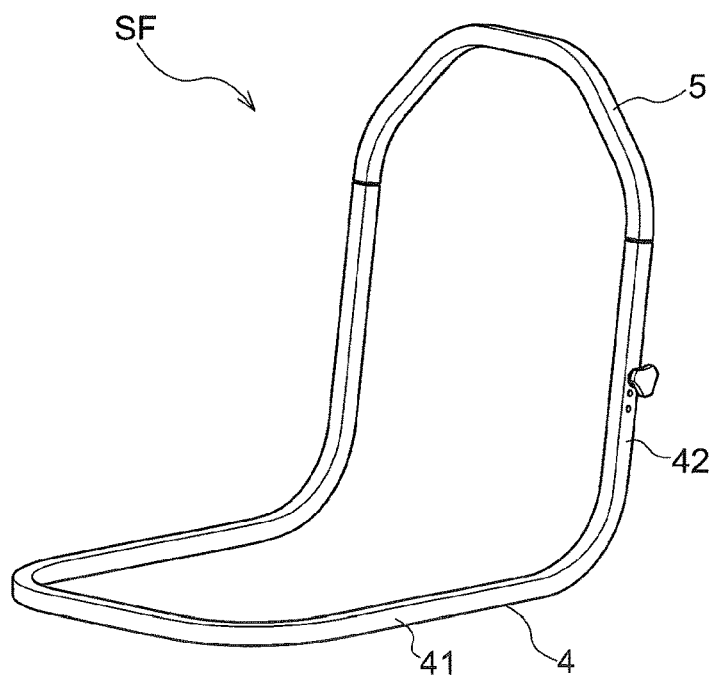
FIG. 4 is a perspective view of a seat frame.

FIG. 3 shows the seat DS. This seat DS consists of a seat frame SF shown in FIG. 4, and a seat cushion 6A and a seat back 6B which are mounted to the seat frame SF. The seat back 6B is vertically divided into an upper seat back 61 and a lower seat back 62. The seat DS is supported to the vehicle body frame 10 via a seat bracket BS which is shown only schematically. The seat bracket SB can be configured as a simple base or can incorporate therein a seat suspension mechanism and/or a front/rear sliding mechanism.

The seat frame SF consists of a bottom frame 4 and a top frame 5. The bottom frame 4 is a framework formed of angular pipes into a U-shape, with the U-shaped frame being bent at mid positions of legs thereof at an angle of 90 degrees approximately. With this bending work, this U-shaped frame is sectioned into a horizontal frame portion 41 forming a horizontal face with a pair of left and right angular pipes extending in the horizontal direction and a vertical frame portion 42 forming a vertical face with a pair of left and right angular pipes extending in the vertical direction.

Figure 5:
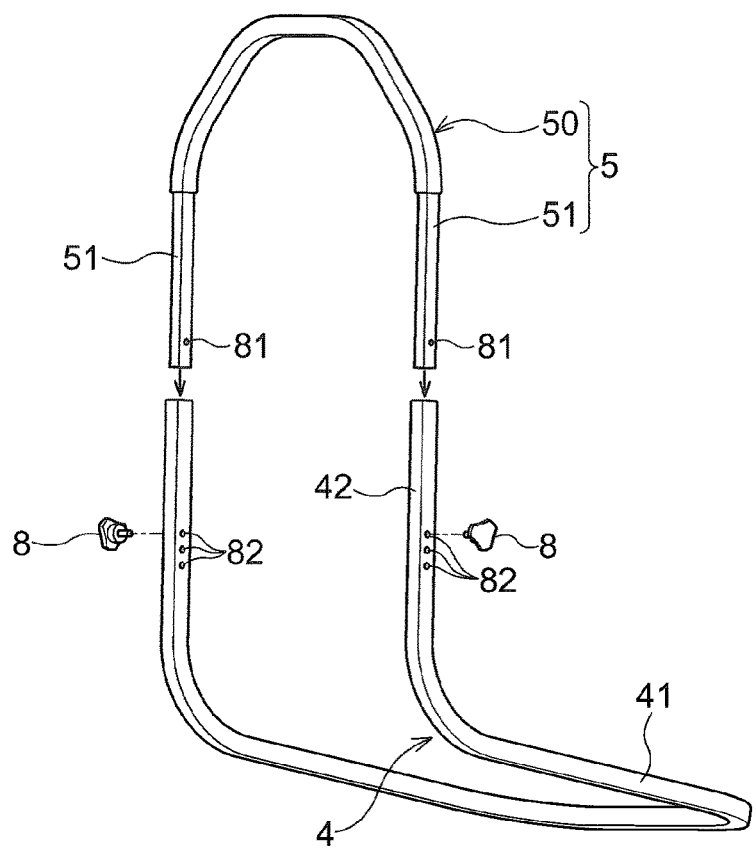
FIG. 5 is a perspective view for illustrating a sliding arrangement of a top frame relative to a bottom frame.

The top frame 5 is a portal-shaped frame, and as shown in FIG. 5, consists of a main body portion 50 formed of an angular pipe bent into a portal shape and a pair of left and right slide rods 51 connected to lower ends of the main body portion 50. Each slide rod 51 has a cross section that can be inserted into a vertically extending angular pipe constituting the vertical frame 42 of the bottom frame 4. In association with an insertion depth of the slide rod 51 into the vertical frame portion 42, the height of the top frame 5 is adjusted.

The left side slide rod 51 defines a setting hole 81 that extends through this slide rod 51 in the transverse direction. The left angular pipe of the vertical frame 42 defines through holes 82 that extend through this angular pipe in the transverse direction. In this embodiment, as a "setting tool" for adjusting the insertion depth of the slide rod 51, namely, the height of the top frame 5, a knob bolt 8 is employed as a fixing pin to be inserted into the through hole 82 and the setting hole 81. At least one of the through hole 82 and the setting hole 81 forms threads to be threaded with the knob bolt 8. By selecting one insertion hole 82 in which the knob bolt 5 is to be inserted, the insertion depth of the slide rod 51 into the vertical frame portion 42, namely, the height of the top frame 5 is determined.

Figure 6:
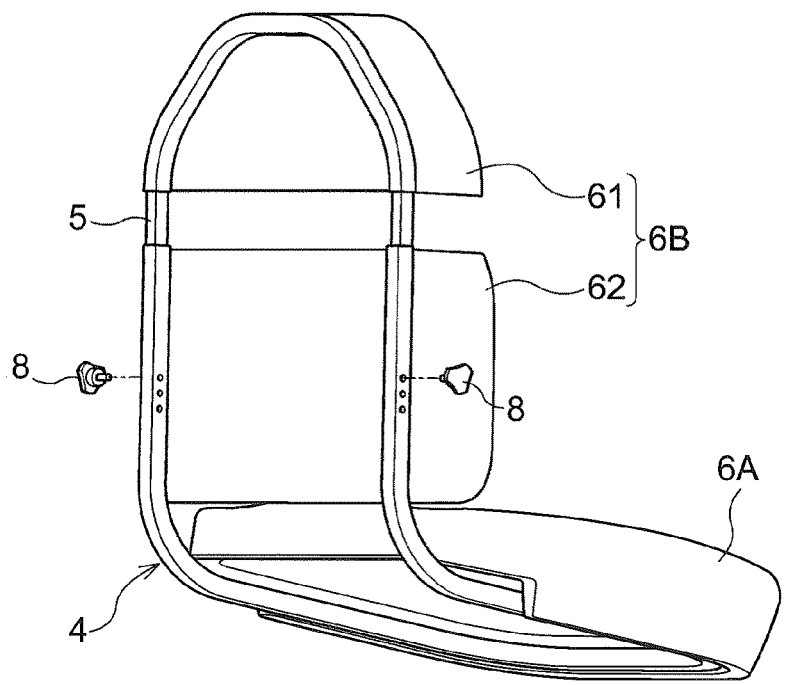
FIG. 6 is a perspective view showing the seat under a condition of its upper seat back being slid to an upper position.

As shown in FIG. 6, to the horizontal frame portion 41 of the bottom frame 4, the seat cushion 6A is attached. And, to the vertical frame portion 42 of the bottom frame 4, the lower seat back 62 is attached, and to the top frame 5, the upper seat back 61 is attached.

In FIG. 6, in the top frame 5, the knob bolts 8 are inserted into the center through holes 82, so that the upper seat back 61 is slightly spaced from the lower seat back 62. Whereas, when the knob bolts 8 ae inserted to the uppermost through holes 82, the upper seat back 61 will be further elevated to be further spaced from the lower seat back 62. And, when the knob bolts 8 are inserted into the bottommost through holes 82, as shown in FIG. 3, the upper seat back 61 will be connected to the lower seat back 62. Though not shown, in the lower face of the upper seat back 61 and the upper faced of the lower seat back 62, there are formed profiles that engage with each other for obtaining a stable connected state.

Backrest sides of the upper end edge region of the lower seat back 62 and the lower end edge region of the upper seat back 61 can be machined to be rounded. With this, it is possible to suppress provision of any special feeling of wrongness to the back of the person contacting these.

In the foregoing embodiment, the vertical sliding arrangement of the top frame 5 relative to the bottom frame 4 was a telescopic insertion arrangement. Aside from this, an arrangement such as a pantograph arrangement may be employed also.

In the foregoing embodiment, as a setting too, there was employed the knob bolts 8 to be inserted into to the setting holes 81 and the through holes 82. Instead, it is also possible to employ a frictional operational tool for frictionally retaining the slide rod 51, a rachet operational tool for ratchet engagement.

In the foregoing embodiment, as a work vehicle to which the inventive seat is applied, a zero-turn mower was used as an example. However, this seat is applicable also to other work vehicles, e.g. an agricultural work vehicle such as a tractor, a rice planting machine, and a combine or off-road vehicles such as utility vehicles, etc.

Incidentally, the arrangements disclosed in the foregoing embodiment (including the further embodiments) may be used in any combinations with the arrangements disclosed in the other embodiments, unless contraction occurs as a result from such combining. Further, the embodiments disclosed in this detailed disclosure are only exemplary. The present invention is not limited thereto, but may be modified appropriately within a range not deviating from the object of the present invention.

The invention claimed is:

1. A seat for a work vehicle comprising:
   a seat bracket supported to a vehicle body frame;
   a bottom frame fixed to the seat bracket;
   a top frame supported to the bottom frame to be vertically slidable relative thereto;
   a setting tool for setting the top fame to the bottom fame at a plurality of vertically adjustable positions, the setting tool comprising a fixing pin to be inserted into one of a plurality of through holes provided in the bottom frame and formed side by side in the vertical direction and
   a setting hole defined in a slide rod of the top frame;
   a seat cushion attached to the bottom frame; and
   a seat back
   comprising an upper seat back attached to the top frame and a lower seat back attached to the bottom frame.

2. The seat of claim 1, wherein:
   the bottom frame includes a pair of left and right horizontal tubular members extending in the horizontal direction and a pair of left and right vertical tubular members extending in the vertical direction;
   the top fame has a portal shape provided at opposed lower ends thereof with downwardly extending slide rods, the slide rod being one of the downwardly extending slide rods; and
   the slide rods are inserted into the vertical members.

3. The seat of claim 1, wherein the fixing pin comprises a knob bolt and at least one of the through hole and the setting hole forms threads to which the knob bolt is to be threaded.

4. The seat of claim 1, wherein when the top frame is positioned adjusted to the lowermost position, an upper face of the lower seat back and a lower face of the upper seat back are connected to each other.

5. The seat of claim 1, wherein:
   the lower seat back has a flat top portion that extends along the entire width of the lower seat back,
   the upper seatback has a flat bottom portion that extends along the entire width of the upper seat back, and
   the flat top portion of the lower seat back and the flat bottom portion of the upper seat back face one another.

6. The seat of claim 1, wherein a backrest side of an upper end edge region of the lower seat back and a lower end edge region of the upper seat back are rounded.

* * * * *

UNITED STATES PATENT AND TRADEMARK OFFICE
CERTIFICATE OF CORRECTION

| | | |
|---|---|---|
| PATENT NO. | : 11,084,401 B1 | Page 1 of 1 |
| APPLICATION NO. | : 16/750402 | |
| DATED | : August 10, 2021 | |
| INVENTOR(S) | : Kirk Payne | |

It is certified that error appears in the above-identified patent and that said Letters Patent is hereby corrected as shown below:

On the Title Page

Insert -- (65) Prior Publication Data US 2021-0229576 A1 Jul. 29, 2021 --

Item (57), Line 5, delete "adjustable position" and insert -- adjustable positions --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*